United States Patent [19]

Walsh

[11] Patent Number: 4,592,971
[45] Date of Patent: Jun. 3, 1986

[54] METAL HALOGEN ELECTROCHEMICAL CELL

[75] Inventor: Fraser M. Walsh, Arlington, Mass.

[73] Assignee: Tracer Technologies, Inc., Newton, Mass.

[21] Appl. No.: 969,228

[22] Filed: Dec. 13, 1978

[51] Int. Cl.[4] .............................................. H01M 4/36
[52] U.S. Cl. ........................... 429/105; 429/198; 429/199; 429/212
[58] Field of Search .............. 429/101, 105, 198, 199, 429/229, 213, 212

[56] References Cited

U.S. PATENT DOCUMENTS

| 4,038,459 | 7/1977 | Ajami | 429/198 X |
|---|---|---|---|
| 4,038,460 | 7/1977 | Walsh et al. | 429/198 X |
| 4,068,046 | 1/1978 | Eustace et al. | 429/105 |
| 4,104,447 | 8/1978 | Walsh et al. | 429/198 X |
| 4,105,829 | 8/1978 | Venero | 429/198 X |
| 4,147,840 | 4/1979 | Walsh et al. | 429/198 X |

FOREIGN PATENT DOCUMENTS 853255 10/1977 Belgium .

Primary Examiner—Charles F. LeFevour
Attorney, Agent, or Firm—Pahl, Lorusso & Loud

[57] ABSTRACT

An improved metal-halogen electrochemical cell, particularly a zinc bromide cell, contains a water soluble tetraorgano-substituted ammonium salt in the electrolyte which forms a substantially water insoluble liquid complex with cathodic halogen thereby reducing self-discharge of the cell.

4 Claims, 1 Drawing Figure

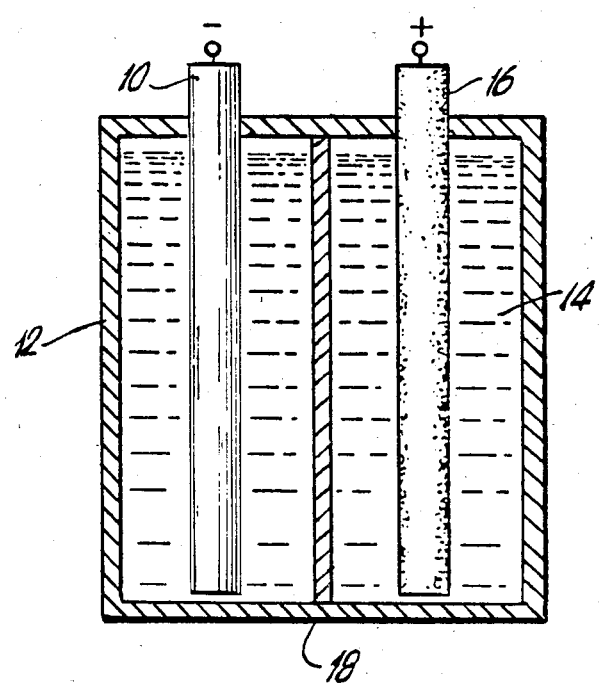

METAL HALOGEN ELECTROCHEMICAL CELL

BACKGROUND OF THE INVENTION

This invention relates to cells containing compounds useful for complexing halogens and more particularly cells and batteries of the type which utilize a halogen as its electrochemically active agent.

Voltaic cells which include an aqueous solution of zinc of cadmium halide as an electrolyte are known, but are frequently characterized by a relatively high self-discharge rate, low capacity, and high internal resistance. Since elemental halogen is soluble in the aqueous electrolyte, it is difficult to keep metallic zinc or cadmium and elemental halogen apart while simultaneously achieving a system in which a good percentage of the theoretical energy storage capacity can be realized.

The instant invention constitutes a further improvement in the halogen cell art and provides a large number of compounds, any one of which may be added to the electrolyte of halogen cells of the type described. The compounds of the invention eliminate the necessity of a depolarizer or a specifically fabricated electrode, yet provide increased halogen complexing ability, enhancing the shelf-life and capacity of the cells and batteries in which they are used.

SUMMARY OF THE INVENTION

The present invention is predicated on the discovery that molecular bromine is sufficiently separated from an aqueous solution in the form of a liquid complex by chemical reaction with certain teraorgano-substituted ammonium salts, especially substituted ammonium bromides. Specifically the tetraorgano-substituted ammonium salt is one which is asymmetrical; it is soluble in water, and, indeed, it is soluble in aqueous zinc bromide solution; and it is capable of combining with molecular bromine to form a substantially water-immiscible liquid complex.

Accordingly, in one embodiment of the present invention there is provided an electrochemical cell comprising a metal anode selected from zinc and cadmium; a bromine cathode; an aqueous metal bromide solution as electrolyte, the metal of the metal bromide being the same as the metal of the anode; and a water soluble asymmetrical tetraorgano-substituted ammonium salt which combines with cathodic bromine to form a substantially water insoluble liquid complex whereby shelf life and cell capacity are improved.

In another embodiment of the present invention, there is provided an aqueous metal bromine secondary battery including a plurality of electrochemical cells, said cells comprising a metal anode, the metal being selected from zinc and cadmium; a nonreactive electrode; an aqueous electrolyte containing a metal bromide, the metal being the same as the metal of the anode; and, a tetraorgano substituted ammonium bromide which is soluble in water, which forms a substantially water insoluble liquid complex with bromine and which acts as a source of cathodic bromine during cell discharge.

BRIEF DESCRIPTION OF THE DRAWING

The sole FIGURE of the drawing is a cross-sectional view of a cell in accordance with the present invention.

DETAILED DESCRIPTION OF THE INVENTION

Turning now to the sole FIGURE of the drawing, there is shown one embodiment of the cell of the present invention. As illustrated in the drawing, an electrochemical cell of the present invention comprises a metal anode 10 disposed in a container 12 containing aqueous electrolyte 14.

The metal anode in accordance with the present invention preferably is selected from zinc and cadmium. It should be noted, however, that it is not absolutely essential that the metal anode be formed solely of zinc or cadmium. Indeed, inert wire mesh or various forms of porous carbon materials upon which zinc or cadmium may be plated can serve very well in forming zinc or cadmium electrode.

Thus, as is conventional practice, the terms "zinc electrode" and "bromine electrode" are not intended to imply that the electrodes are formed from these materials exclusively; but, are used merely to indicate the electrochemically active element reacting. Because cadmium is electrochemically similar to zinc, it is also obvious that the zinc of the electrode and the electrolyte can be replaced by cadmium. Futhermore, those skilled in the art will appreciate that the complex may be used to drive cells other than disclosed zinc and cadmium cells. For example, the complexes will be useful in other halogen utilizing cells which may employ titanium, chromium, or hydrogen as an anode.

Although bromine is used throughout this specification and claims, it will be apparent to those skilled in the art that chlorine, iodine, or any combination of bromine, chlorine, and iodine may be substituted for bromine. Although reference is made to the addition of one additive, a mixture of additives may be used in any one cell.

Furthermore, although reference is made to one counter electrode and one metal electrode, it is obvious that the compounds of the invention are useful in cells which include more than one pair of electrodes and with batteries of two or more cells constructed in accordance with methods known to those skilled in the art.

Spaced apart from the anode 10 is a chemically inert electrode 16. Inert electrode 16 is disposed within container 12 so as to be in contact with aqueous electrolyte 14 and the bromine active cathodic material which material will be described hereinafter in greater detail. Turning first, however, to electrode 16 it should be noted that a wide range of inert materials can be used for fabricating electrode 16, such as various forms of electrically conductive and non-corrosive materials, including porous carbon, graphite, vitreous carbon composites, and carbon felt. Indeed, the inert electrode 16 preferably is formed of a highly porous material which will absorb the bromine active material. A suitable chemically inert electrically conductive material for forming an inert electrode 16 for the practice of the present invention is carbon felt, such as UCAR grade VDF carbon felt sold by Union Carbide Corporation, Carbon Products Division, 270 Park Avenue, New York, N.Y.

The electrolyte of the cell of the present invention is an aqueous metal bromide solution in which the metal of the bromide corresponds to the metal of the anode. Thus, when zinc is the anode active material, the metal bromide used in the electrolyte is a zinc bromide. Similarly, with cadmium as the active metal anode material, the electrolyte is an aqueous cadmium bromide solution.

The concentration of metal bromide in the aqueous electrolyte is not critical and a wide range of concentrations may be employed depending, for example, on the desired energy density of the cell. Typically, the molarity of the aqueous metal bromide solution will be in the range of about 2.5 to 3.5 molar although the concentration can be as low as 0.5 molar and as high as 6.0 molar and higher.

Optionally, and preferably, other salts such as zinc sulfate may be added to the electrolyte to improve electrolyte conductivity and/or zinc plating characteristics. The effects of such additives are well known and form no part of the present invention.

As is shown in the sole FIGURE of the drawing, the cell is provided with a separator 18 which prevents internal shorting that can typically occur as a result of dendrite growth. The separator 18 can be any porous material typically used to prevent physical contact of the two electrodes such as fiberglass mats, fiberglass felt, microporous polymeric materials such as porous polyethylene, and the like. A suitable separator may be purchased from W. R. Grace, Inc. under the tradename DARAMIC.

As is indicated hereinbefore, the cathode active material of the present invention is molecular bromine.

Additionally, the cathode active material is present as a substantially water-insoluble, liquid halogen complex of an asymmetrical (i.e. it does not have an axis of symmetry in the molecule) tetraorgano-substituted ammonium salt. The asymmetrical, tetraorgano-substituted ammonium salts suitable in the practice of the present invention are defined by the following characteristics. First, the tetraorgano-substituted ammonium salt must be soluble in aqueous electrolyte, especially 2.5 to 3.5 molar zinc bromide solution; and, second, it must be one which is capable of combining with the cathodic bromine. Third, the halogen complex when it contains at least one molar equivalent of halogen must be a substantially water immiscible liquid in the cell to which it is applied at temperatures in the range of from about 10° C. to about 60° C. The tetraorgano-substituted ammonium salts presently contemplated can be represented by the general structural formula:

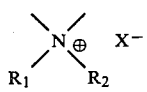

where the dangling valences of the nitrogen atom are connected to carbon atoms of saturated hydrocarbyl radicals forming a five-membered ring system including the nitrogen (thus the nitrogen atom is an endocyclic nitrogen atom), or a six-membered ring system including another heteroatom or a saturated seven member ring structure. Typically, the other heteroatom will be oxygen or sulfur. In the above formula, $R_1$ is an alkyl or haloalkyl radical of from 1 to 8 carbon atoms attached to the nitrogen atom by a carbon atom and $R_2$ is an alkyl or haloalkyl organic radical of from 1 to 8 carbon atoms attached to the nitrogen atom by a carbon atom. In the above formula, $R_2$ may be the same as $R_1$ when the saturated hydrocarbyl radical includes a lower alkyl or haloalkyl substituent from 1 to 4 carbon atoms; otherwise, $R_2$ is different from $R_1$. The anion of the salt, X-, generally is a chloride or bromide anion and especially is a bromide.

As a further illustration of the compounds contemplated by the present invention are asymmetrical piperidinium, pyrrolidinium and morpholinium salts represented by the following formulas:

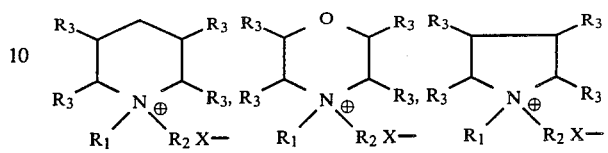

wherein $R_1$ is a methyl group and $R_2$ is selected from alkyl groups having from 1 to 8 carbon atoms, such as ethyl, propyl, isopropyl and the like and haloalkyl groups having from 1 to 8 carbon atoms such as chloromethyl and bromomethyl groups, and $R_3$ is independently at each occurrence selected from hydrogen and alkyl groups having from 1 to 4 carbon atoms; and when $R_3$ is hydrogen at each location, $R_2$ is different from $R_1$. The anion, X-, in each of the foregoing is selected from bromide and chloride, and is preferably bromide.

Examples of compounds within the above-mentioned class of compounds are the following:

| Formula | Name |
|---|---|
| 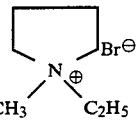 | N—ethyl, N—methylpyrrolidinium bromide |
| 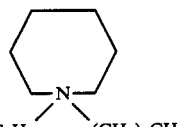 | N—ethyl, N—hexyl homopiperidinium bromide |
| 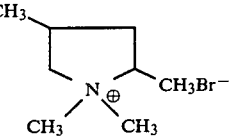 | N,N—dimethyl, 2,4-dimethyl pyrrolidinium bromide |
| 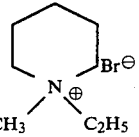 | N—ethyl, N—methyl piperidinium bromide |
| 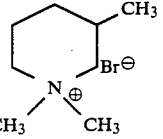 | N,N—dimethyl, 3-methyl piperidinium bromide |
| 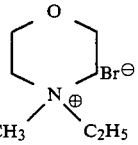 | N—ethyl, N—methyl morpholinium bromide |

| Formula | Name |
|---|---|
| 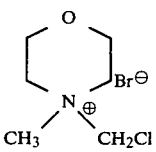 | N—chloromethyl, N—methyl morpholinium bromide |
| 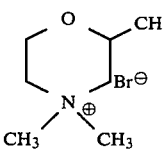 | N,N—dimethyl, 3-methyl morpholinium bromide |
| 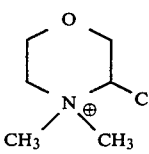 | N,N—dimethyl, 2-methyl morpholinium bromide |
| 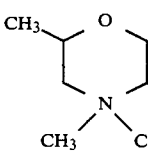 | N,N—dimethyl, 2,5-dimethyl morpholinium bromide |

The tetraorgano-substituted ammonium salt used in the cell of the present invention is dissolved in the electrolyte solution 14 where it is available to complex the bromine upon charging of the cell. The amount of tetraorgano-substituted ammonium salt used, e.g., the bromide, will depend upon the amount of metal bromide present and the depth of charge among other things. Generally, however, the ratio of tetraorgano-substituted ammonium salt to bromide employed will be from about 1:4 to about 1:1. Typically, the ratio of tetraorgano-substituted ammonium salt to metal bromide used will be 1:3.

The above-mentioned tetraorgano-substituted ammonium salts are prepared by well known techniques. Typically, these compounds are prepared by reacting an appropriate tertiary amine with an appropriate alkyl halide. For example, N-ethyl, N-methyl morpholinium bromide can be prepared by reacting N-methylmorpholine with ethyl bromide in a suitable solvent. Similarly, N-ethyl, N-methyl pyrrolidinium bromide can be prepared by reacting N-methyl pyrrolidine with ethyl bromide in a suitable solvent. The corresponding piperidinium compounds too are prepared by the same general technique.

The tertiary amines and the alkyl halides are generally commercially available; however, preparative methods also are found in the chemical literature.

As will be appreciated, when the cell is charged, bromine is produced at the surface of the inert cathode 16 where it will complex with the halogen complexing ammonium salt present in the electrolyte to form a liquid immiscible bromine complex. Thus, with a zinc bromide electrolyte, bromine is generated at electrode 16 during charging of the cell. The bromine so generated is complexed by the ammonium salt while the zinc is deposited on electrode 10.

In the cell shown in the drawing, it should be noted that the inert electrode 16 is a porous material which is capable of storing the liquid bromine complex within the pores or shelves on the electrode structure.

It will be appreciated that one of the advantages in the use of asymmetrical (i.e., not having an axis of symmetry in the molecule) tetraorgano-substituted ammonium salts in accordance with the present invention is that the bromine complex which results from the combination of the cathodic bromine and the salt is a liquid at least at cell operating temperatures and it is fluid. It does not require additional volumes of material such as aprotic solvents or organic materials to keep the complex in a liquid form, thereby increasing the volume of the liquid that must be handled in order to complex the bromine.

The following examples illustrate modes of practicing the present invention.

EXAMPLE 1

A zinc-bromine secondary cell was constructed using a rectangular glass case in which the bromine electrode consisted of a graphite current-collector against which was pressed a graphite felt (UCAR grade WDF graphite felt, Union Carbide Corp.). This bromine electrode was held separated by glass rods and KYNAR sheet from a zinc electrode consisting of a graphite plate; the approximate surface area was 40 cm$^2$ of each electrode. The electrolyte consisted of 0.4M ZnBr$_2$, 0132M N,N-dimethyl morpholinium bromide and 0.2M ZnSO$_4$. The cell was cycled at 22° C. under a 0.5 amps for 12 hours and 0.3 amp discharge regime. An output of 2.3 and 2.0 amp-hours to 1 V was obtained in the first two cycles. A fluid bromine-rich oil was observed on the bottom of the cell at full charge.

EXAMPLE 2

A cell identical to that described in Example 1 was used in which the electrolyte contained 1.5M ZnBr$_2$, 0.2M ZnSO$_4$, 0.85M N,N-dimethyl morpholinium bromide and 0.65M N,N,N,N-tetramethyl ammonium bromide. This cell was cycled at 22° C. under varying charge (0.5 to 1.5 amp) and discharge (0.2 to 0.5 amp) regimes; upon discharge, 1.5 to 3.0 amp-hours were obtained to 1 V. At full charge a fluid bromine-rich oil was observed on the bottom of the cell.

EXAMPLE 3

A cell identical to that described in Example 1 was used in which the electrolyte contained 1.0M ZnBr$_2$ and 0.2M ZnSO$_4$. When this cell was charged at 0.5 amp for 12 hours and discharged at 0.2 amp less than 0.3 -amp-hour were obtained to 1 V. This Example shows the improvement obtained in cell performance upon the addition of a compound of this invention.

EXAMPLE 4

Two cells (a generator cell and a discharge cell) as described in Example 1 were linked via glass tubes (approx. ¼ inch diameter) to deliver flluid from the bottom of one cell to the bromine electrode of the other; air bubbles were used in the glass tubes to move the bromine rich liquid from the bottom of the generator cell to the discharge cell. A similar air lift pump was also used to move spent electrolyte from the bottom of the discharge cell to the top of the generator cell. The generator cell was charged at 0.1 amps; after sufficient oil had collected at the bottom of the generator cell, the air pumps were started and, while the generator cell continued to produce oil under charge, the discharge cell was discharged under a load of 0.1 amps. This system was run at approximately 30° C. without incident for seven hours.

EXAMPLE 5

A cell was constructed consisting of a stack of three graphite cylinders (approx. 1 inch in diameter and 2 inches long): in one end of each cylinder, a cone (approx. 1 inch deep) was drilled and on the other end a ⅛ inch graphite ring was glued to form an enclosed area which was filled with N-ethyl, N-methyl morpholinium septabromide from a tube which entered from beneath through the side of the cylinder. The cones, filled with zinc powder and two pieces of fiberglass (wetted with 1M $ZnBr_2$), were placed across the face of the zinc; the cylinders were then glued in a stack with the bottom cylinder glued to a plate of graphite on which was glued a ring of graphite to enclose the liquid septabromide fed in from beneath through a tube. This three cell stack had a 4.9 $cm^2$ electrode surface area; it was discharged at 22° C. at 0.055 amps and the rate of uptake of the liquid septabromide was measured. Percent efficiency of utilization of the liquid septabromide based on observed amp-hours discharged was in excess of 95%; equally high efficiencies were observed of liquid polybromide production under charge based on volume change in liquid polybromide.

EXAMPLE 6

A number of compounds of the invention were evaluated to demonstrate that they form liquid organic polyhalides at room temperature (20°–25° C.) as 0.1M solutions in 1.0M $ZnBr_2$. The compounds of the invention were added to 2 ml of the aqueous solution in a test tube and then 0.25 ml of bromine added; the formation of a liquid polybromide which is a substantially water immiscible liquid was noted. Those compounds which do form a liquid can be used as substitutes for the exemplar compounds identified in the previous examples. The following compounds formed liquid polybromides at room temperature immediately upon addition of the bromine: N-chloromethyl, N-methyl morpholonium bromide, N-ethyl, N-butyl piperidinium bromide, N-ethyl, N-2-bromoethyl piperidinium bromide, N-ethyl, N-hexyl homopiperidinium bromide and N-ethyl-N-2-cyanoethyl pyrrolidinium bromide.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In an electrochemical cell having a metal anode selected from the group consisting of zinc and cadmium; a bromine cathode; and, an aqueous electrolyte containing a metal bromide, the metal bromide having the same metal as the metal of the anode, the improvement comprising: a bromine complexing agent in said aqueous metal bromide electrolyte consisting solely of a tetraorgano substituted ammonium salt, which salt is soluble in water and forms a substantially water immiscible liquid bromine complex at temperatures in the range of about 10° C. to about 60° C. and wherein the tetraorgano substituted ammonium salt is selected from asymmetric quaternary ammonium compounds having the formula:

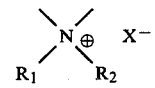

wherein the dangling valences of nitrogen indicates that the nitrogen is an endocyclic nitrogen atom connected to carbon atoms, thereby forming a saturated seven member ring structure and wherein X- is a halide selected from chloride and bromide, and $R_1$ and $R_2$ are selected from alkyl groups and haloalkyl groups of from 1 to 8 carbon atoms.

2. The cell of claim 1 wherein the quaternary ammonium compound is a homopiperidinium bromide.

3. In an electrochemical cell having a metal anode selected from the group consisting of zinc and cadmium; a bromine cathode; and, an aqueous electrolyte containing a metal bromide, the metal bromide having the same metal as the metal of the anode, the improvement comprising: a bromine complexing agent in said aqueous metal bromide electrolyte consisting solely of a tetraorgano substituted ammonium salt, which salt is soluble in water and forms a substantially water immiscible liquid bromine complex at temperatures in the range of about 10° C. to about 60° C. and wherein the tetraorgano substituted ammonium salt is selected from asymmetric quaternary ammonium compounds having the formula:

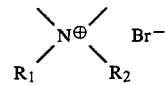

wherein the dangling valences of nitrogen indicates that the nitrogen is an endocyclic nitrogen atom connected to carbon atoms, thereby forming a saturated seven member ring structure.

4. In an electrochemical cell having a metal anode selected from the group consisting of zinc and cadmium; a bromine cathode; and, an aqueous electrolyte containing a metal bromide, the metal bromide having the same metal as the metal of the anode, the improvement comprising:
a bromine complexing agent in said aqueous metal bromide electrolyte consisting solely of N-ethyl-N-2-cyanoethyl pyrrolidium bromine, which bromine complexing agent is soluble in water and forms a substantially water immiscible liquid bromine complex at temperatures in the range of about 10° C. to about 60° C.

* * * * *